Figure 1:
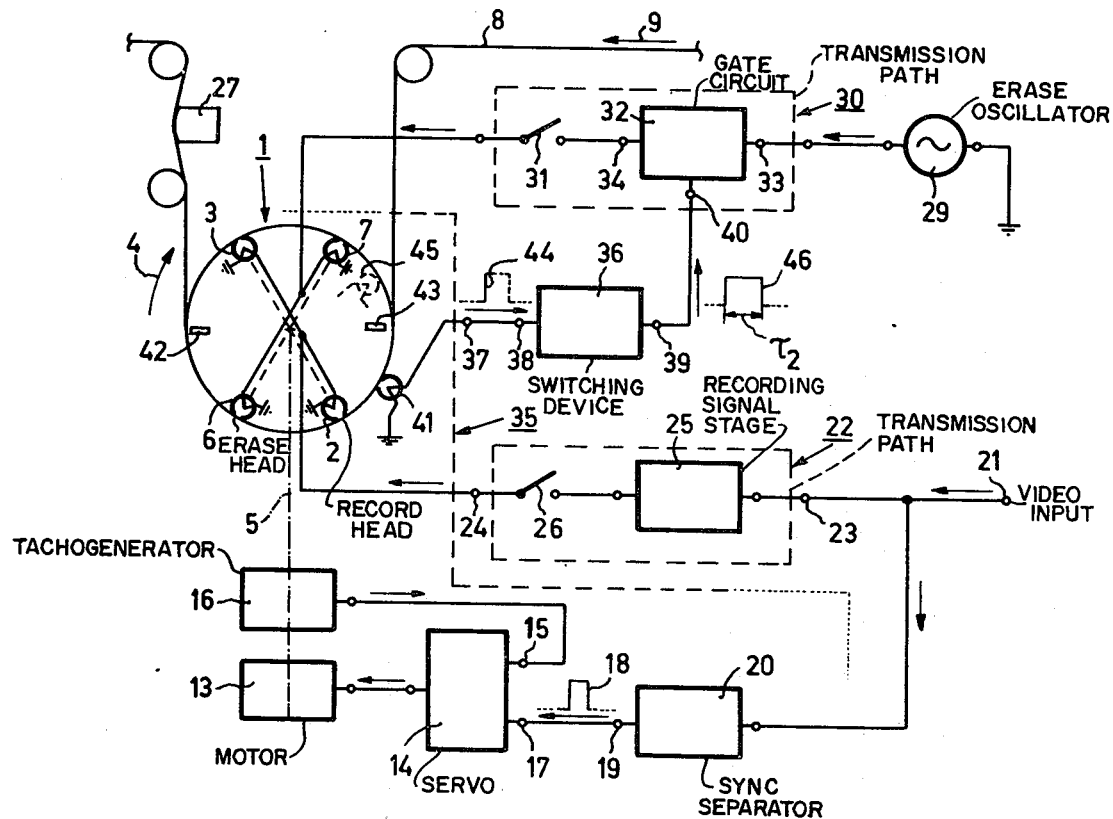

United States Patent [19]

Lackner

[11] 4,005,481
[45] Jan. 25, 1977

[54] RECORDING AND/OR PLAYBACK APPARATUS WHICH PREVENTS ERASURE OF THE SYNCHRONIZATION TRACK

[75] Inventor: Robert Lackner, Vienna, Austria

[73] Assignee: U.S. Philips Corporation, New York, N.Y.

[22] Filed: July 15, 1975

[21] Appl. No.: 596,204

Related U.S. Application Data

[63] Continuation of Ser. No. 426,256, Dec. 19, 1973, abandoned.

[30] Foreign Application Priority Data

Jan. 29, 1973 Austria .................................. 743/73

[52] U.S. Cl. ..................................... 360/60; 360/66
[51] Int. Cl.² ........................................ G11B 15/04
[58] Field of Search ................... 360/66, 60, 14, 61, 360/33

[56] References Cited

UNITED STATES PATENTS

| | | | |
|---|---|---|---|
| 3,084,215 | 4/1963 | Bounsall .............................. 360/14 |
| 3,342,949 | 9/1967 | Wessels .............................. 360/66 |
| 3,504,116 | 3/1970 | Sato .................................... 360/66 |

Primary Examiner—Bernard Konick
Assistant Examiner—Alan Faber
Attorney, Agent, or Firm—Frank R. Trifari; Simon L. Cohen

[57] ABSTRACT

The invention relates to a recording and/or playback apparatus for video signals, equipped with a rotary head system with at least one recording and/or playback head and at least one erase head for the trackwise erasing of a video signal recorded in the video tracks, which tracks cross a further track, specifically a synchronization track, the erase signal being applied to the rotating erase head via a time-controlled gate circuit, which interrupts the path of the erase signal to the erase head while said head scans the further track, thus preventing a signal recorded in the further track from being erased.

3 Claims, 3 Drawing Figures

RECORDING AND/OR PLAYBACK APPARATUS WHICH PREVENTS ERASURE OF THE SYNCHRONIZATION TRACK

This is a continuation of application Ser. No. 426,256, filed Dec. 19, 1973, now abandoned.

The invention relates to a recording and/or playback apparatus for video signals, equipped with a rotary head system which trackwise scans a record carrier and which comprises at least one recording and/or playback head and at least one erase head for trackwise erasing a recorded video signal.

According to the invention it is proposed that in an apparatus where the tracks in which the video signal is recorded cross at least one further track on the record carrier, the transmission path for the erase signal to the erase head should include a gate circuit which is controlled by a pulse source, whose pulses are locked to the field synchronizing pulses of a video signal to be recorded and which appear in a fixed time relationship to a specific position of the erase head relative to the further track to be crossed, and by a subsequent switching device, the actuation of which is retarded relative to the instant that the pulses from the pulse source appear by a delay time which substantially corresponds to a time interval $\tau_1$ from the instant that a pulse from the pulse source appears until the instant at which the erase head reaches the further track to be crossed, while the duration of said switching process substantially equals a time interval $\tau_2$ required by the erase head for scanning the further track to be crossed, the gate circuit interrupting the transmission path to the erase head during said switching process. This ensures that signals possibly recorded in the further track are not affected by a trackwise erasure previous to a trackwise recording of a video signal to be recorded.

To obtain the actuation delay for the switching device in the simplest possible manner it appears to be advantageous when the switching device is constituted by two series-connected switching stages, the first switching stage which follows the pulse source having a switching time which substantially corresponds to the time interval $\tau_1$ from the instant that a pulse from the pulse source appears until the instant at which the erase head reaches the further track to be crossed, the second switching stage which is controlled by said first switching stage having a switching time which substantially corresponds to the time interval $\tau_2$ required by the erase head for scanning the further track to be crossed, and the gate circuit interrupting the transmission path to the erase head during the operation of the second switching stage.

Furthermore, it is found to be very advantageous for the embodiment of the pulse source of an apparatus according to the invention when an existing apparatus stage which carries the field synchronizing pulses is directly used as a pulse source. This obviates the use of a separate pulse source in the apparatus, thus making the apparatus simpler and less expensive of manufacture.

Figure 2:
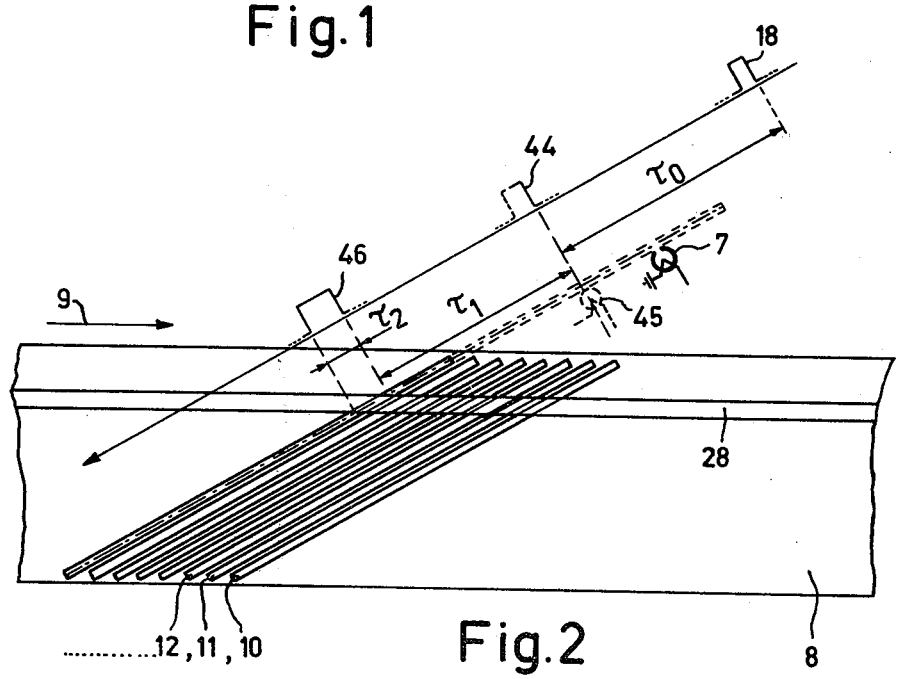
Figure 3:
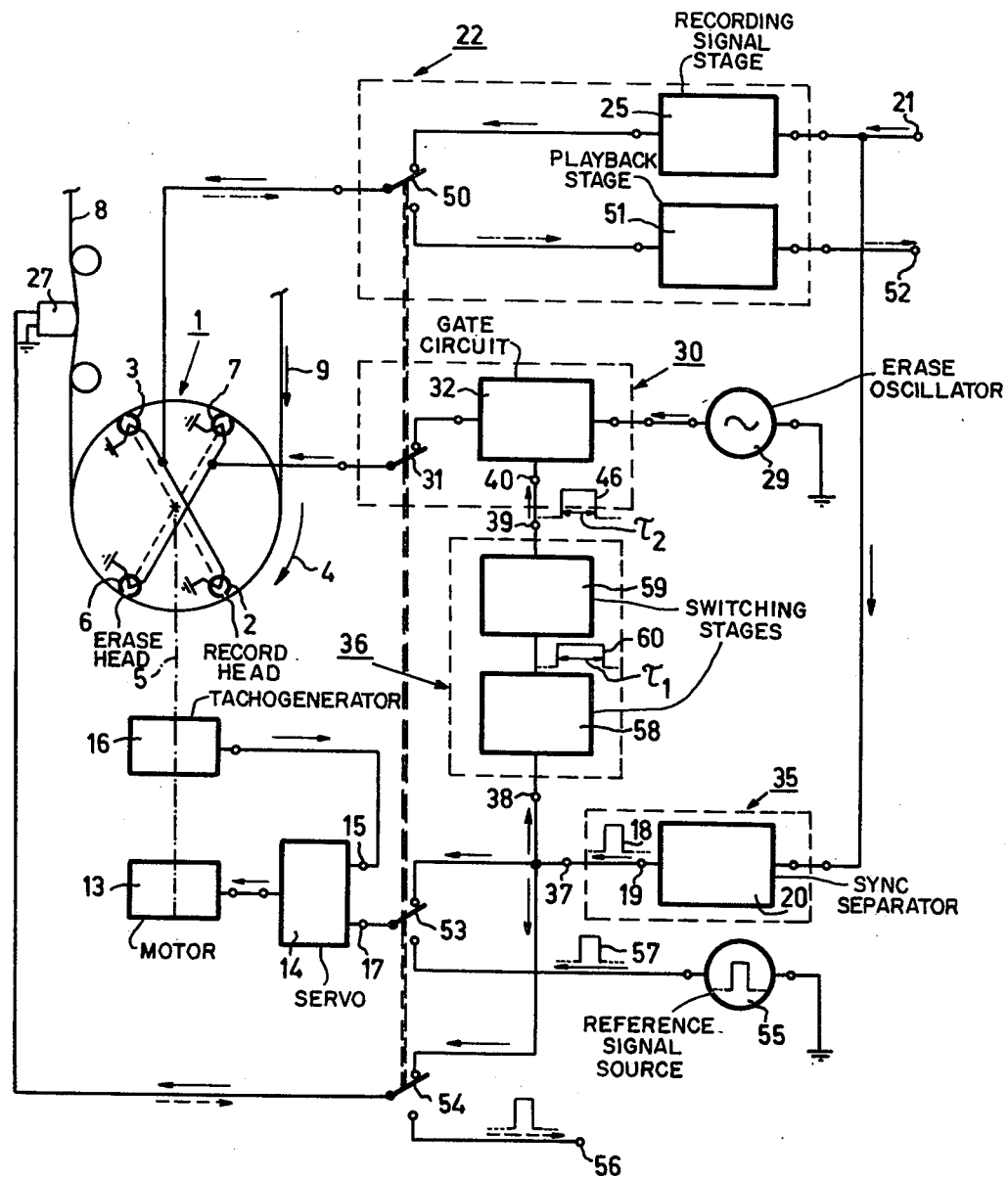

The invention will be described in more detail with reference to two embodiments shown in the accompanying drawing to which the scope of the invention is not limited. In the drawing:

FIG. 1 shows the circuit arrangement of an apparatus according to the invention which includes a separate pulse source, FIG. 2 shows the track configuration of a record carrier with reference to which the operation of the apparatus of FIG. 1 is described, and FIG. 3 shows the circuit arrangement of a further suitable embodiment of the apparatus according to the invention, in which the pulse source is constituted by an apparatus stage which carries the field synchronizing pulses.

The embodiment of FIG. 1 is a recording apparatus for video signals, which is equipped with a rotary head system 1, which comprises two recording heads 2 and 3 and two erase heads 6 and 7 which precede the recording heads 2, 3 viewed in the direction of rotation 4 of the head system 1 and which are staggered relative to the recording heads 2, 3 in the direction of the axis 5 of the system 1. This arrangement of the heads 2, 3; 6, 7 of the head system 1 in a conventional manner ensures that the two associated heads 2, 6 and 3, 7 scan the same obliquely arranged tracks 10, 11, 12 etc. (see FIG. 2) of the record carrier 8 which is helically wound around the rotary head system 1, as is schematically illustrated by FIG. 1 and which in the "normal winding" mode is advanced in the direction of the arrow 9 by a drive shaft, not shown.

For driving the rotary head system 1 the apparatus incorporates a motor 13 which is coupled to the shaft 5 of the rotary head system 1, the speed of said motor being controlled by a servo circuit 14 connected thereto. An input 15 of the servo circuit 14 is connected to a tachogenerator 16 which is coupled to the shaft 5 of the head system 1. A further input 17 of the servo circuit 14 is connected to an output 19 of a separator stage 20, at which output the field synchronizing pulses 18 of a video signal to be recorded are available. The separator stage 20 is connected to a signal input 21 of the apparatus, to which input a video signal to be recorded can be applied.

For applying a video signal to be recorded to the recording heads 2, 3 of the rotary head system 1, the apparatus includes a transmission path 22, schematically shown, whose input 23 is connected to the signal input 21 of the apparatus and whose output 24 is connected to the recording heads 2, 3 for example via a rotary transformer. The transmission path 22 in the shown embodiment includes a recording signal stage 25 and a switch 26 for starting a recording process.

The operation of the circuit arrangement described above will now be described in more detail. A video signal to be recorded which is available at the signal input 21 of the apparatus is fed to the separator stage 20, in which the field synchronizing pulses 18 are extracted from the video signal to be recorded, which pulses are applied to a further input 17 of the servo circuit 14 as the desired signal. The signal produced by the tachogenerator 16 is fed to the input 15 of the servo circuit 14 as the measured signal. In the servo circuit 14 the desired signal and the measured signal are compared with each other and a control signal is produced which is a measure of the difference between these signals. The control signal influences the motor current and motor voltage so as to maintain the speed of the motor 13 constant at a specific value.

The video signal is moreover fed from the signal input 21 of the apparatus to the recording signal stage 25, where the video signal is processed for subsequent registration. In the case of a black-white-video signal this processing may, for example, be frequency modulation. In the case of a colour video signal this signal is, for example, split up into a luminance signal and a chrominance signal in the recording signal stage 25, after which the luminance signal is frequency modulated and the chrominance signal is transposed, the frequency-modulated luminance signal and the transposed chrominance signal being subsequently recombined. The processed video signal is available at the output of the recording signal stage 25.

By the actuation of the switch 26 the apparatus is set to the "recording" mode and the transmission path 22 for the video signal is closed, so that the processed video signal is fed to the recording heads 2, 3 of the rotary head system 1 for the trackwise recording on the record carrier 8. During the recording process the recording heads 2, 3 of the rotary head system 1 consecutively scan the tracks 10, 11, 12 etc. which are arranged obliquely on the record carrier 8 which advances in the direction of the arrow 9 and record the applied video signal to be recorded in said tracks.

This embodiment furthermore comprises a stationary magnetic head 27, which scans a further track 28, which extends in the longitudinal direction of the record carrier 8 and which is crossed by the tracks 10, 11, 12 etc., in which the video signal is recorded. By means of the magnetic head 27 for example an audio signal, a control signal or a synchronizing signal can be recorded in the further track 28.

Furthermore, an erase oscillator 29, via a transmission path 30 which includes a switch 31 for switching on an erasing process, can be connected to the erase heads 6, 7 of the rotary head system 1 for example via a further rotary transformer, so that prior to a new recording a previously recorded vido signal on the tracks 10, 11, 12, etc., can be erased trackwise.

The transmission path 30 for the erase signal now includes a gate circuit 32 which is conducting in the rest position, whose input 33 is connected to the erase oscillator and whose output 34 is connected to the erase heads 6, 7 via the switch 31 for switching on the erasing process. For controlling the gate circuit 32, a pulse source 35 followed by a switching device 36 are provided, an output 37 of the pulse source 35 being connected to an input 28 of the switching device 36 and an output 39 of the switching device 36 being connected to a control input 40 of the gate circuit 32.

The pulse source 35 includes a stationary scanning head 41 and two magnets 42 and 43 disposed on the rotary head system 1, which during rotation of the head system 1 serve for producing pulses 44 in the scanning head 41. By means of the servo system 13, 14, 16 for controlling the speed of the rotary head system 1 the pulses 44 are locked to the field synchronizing pulses 18 of the video signal to be recorded, which are applied to the servo circuit 14. Thus, as is evident from FIGS. 1 and 2, there is a time relationship between the instant at which the pulses 44 of the pulse source 35 appear and the instant at which the field synchronizing pulses 18 appear ($\tau_o$). Moreover, the pulses 35 appear in a fixed time relationship with respect to a specific position 45 of the erase heads 6, 7 relative to the further track 28 to be crossed, because the magnets 42, 43 and the erase heads 6, 7 are arranged on the rotary head system 1 in a fixed spatial position relative to each other.

The switching device 36 produces a pulse shaped switchin signal 46 at its output 39, the beginning of the switching process of the switching device 36 being delayed relative to the instant at which the pulses 44 from the pulse source 35, i.e. their leading edges, appear, by a delay time obtained with the aid of conventional delay means, which delay time substantially corresponds to a time interval $\tau_1$ between the instant that a pulse from the pulse source 35 appears and the instant at which the erase head 6 or 7 of the rotary head system 1, whichever is first, reaches the further track 28. The duration of the switching process of the switching device 36 substantially equals a time interval $\tau_2$, required by the erase heads 6, 7 for scanning the further track 28 to be crossed.

By the actuation of the switch 31, which may be coupled to the switch 26 for starting a recording process, a trackwise erasing process is initiated. As a result, the erase signal from the erase oscillator 29 is fed via the gate circuit 32, which is conducting in the rest condition, and the closed switch 31 to the rotating erase heads 6, 7, which trackwise erase a video signal that has been previously recorded on the record carrier 8. At the instant at which for example the magnet 43 on the rotary head system 1 generates a pulse 44 in the scanning head 41, the associated erase head 7 is in the specific position 45 relative to the further track 28 to be crossed as schematically shown in FIGS. 1 and 2. The resulting pulse 44 is fed to the switching device 36, which subsequently supplies the pulse-shaped switching signal 46 at its output 39, which signal relative to the instant at which the leading edge of the pulse 44 appears is delayed by said time $\tau_1$ and is continued during said time interval $\tau_2$. The switching signal 46 blocks the gate circuit 32 via control input 40, so that the gate circuit 32 interrupts the transmission path 30 for the erase signal while the erase head 7 scans the further track 28. After the time interval $\tau_2$ gate circuit 32 conducts again and closes the transmission path 30 for the erase signal, so that the trackwise erasing process is continued. A similar process is repeated in a corresponding manner for the second erase head 6 during the scanning of the next track.

The steps described hereinbefore thus permit a trackwise erasure of a recorded video signal, the erasing process being interrupted while the erase heads of the rotary head system scan a further track provided on the record carrier. Thus, a previously recorded video signal can be erased trackwise, without a signal recorded in the further track being erased.

As is evident from the above, the delay time before the beginning of the switching process of the switching device can be obtained by means of the switching device itself. Another possibility is to design the pulse source so that the delay time $\tau_i$ is directly determined by the duration of the pulses from the pulse source. In that case the beginning of the switching process of the switching device is defined by the trailing edges of the pulses from the pulse source and the switching device performs an on/of operation the duration of which again corresponds to the time interval $\tau_2$, required by a rotating erase had for scanning the further track to be crossed.

Similar steps have been taken in the embodiment of FIG. 3. In this apparatus the transmission path 22 for the video signals includes a switch 50 for switching between the "recording" and "playback" modes, which in the "recording" mode electrically connects the recording stage 25 and in the "playback" mode a playback stage 51 to the recording playback heads 2, 3. The other side of the playback stage 51 is connected to a signal output 52 of the apparatus.

The switch 50 is coupled to the switch 31 for starting a trackwise erasing process and furthermore to two switches 53 and 54. In the "recording" mode a switch 53 connects the further input 17 of the servo circuit 14, which input serves for applying the desired signal, to the output 19 of the separator stage 20 which carries the field synchronizing pulses 18 and in the "playback" mode to a reference signal source 55. In the "recording" mode the output 19 of the separator stage 20 is furthermore connected to the magnetic head 27 via the switch 54. In the "playback" mode the switch 54 connects the magnetic head 27 to a terminal 56, which is electrically connected to a servo system, not shown, for controlling the speed of the drive shaft which advances the record carrier 8.

For recording a video signal which is applied to the signal input 21 of the apparatus the switch 60 is set to the position corrresponding to the "recording" mode described above. In this case the processes relating to the processing of the video signal and the control of the speed of the rotary head system are the same as those described with reference to the embodiment of FIG. 1. In addition to these processes, the field synchronizing pulses 18 of the video signal to be recorded are fed to the stationary magnetic head 27 via the switch 54, which head records said pulse train in the further track 28 which extends in the longitudinal direction of the record carrier 8.

For reproducing a recorded video signal the switch 50 is set to the position which corresponds to the "playback" mode. As a result, the video signal which is scanned from the record carrier 8 by the recording/playback heads 2, 3 is applied to the playback stage 51 for further processing. The video signal appearing at the output of the playback stage 51 is fed to the signal output 52 of the apparatus where it is available for application to, for example, a television receiver.

In the "playback" mode pulses 57, which are produced by the reference signal source 55 and which in this case may, for example, be derived from the mains frequency, are applied via the switch 53 to the further input 17 of the servo circuit 14 as the desired signal, so that in this mode the control signal for controlling the speed of the motor 13 is obtained by comparing the pulses supplied by the tachogenerator 16 with the pulses 57 supplied by the reference signal source 55.

In the "playback" mode the field synchronizing pulses recorded in the further track 28 are scanned by the magnetic head 27 and via the terminal 56 they are applied to the servo-system, not shown, which serves for controlling the drive shaft for advancing the record carrier, as the actual signal. The pulses 57 produced by the reference signal source 55 may then also be applied to this servo system as the desired signal.

For example, if with such an apparatus a previously recorded video signal from a certain point onwards is to be replaced by another signal to be recorded, the servo systems of the apparatus must be in the "playback" mode while the apparatus is in the "recording" mode, in order to ensure that the field synchronizing pulses previously recorded in the further track can maintain the synchronism of the record carrier at the transition from the previously recorded video signal to the new video signal to be recorded. However, before the new video signal is recorded, the previously recorded video signal must be erased trackwise from the said point onwards.

In the present embodiment the separator stage 20 which carries the field synchronizing pulses directly serves as a pulse source 35. The output 37 of the pulse source 35 is connected to the input 38 of the switching device 36, which in this case is formed by two series-connected switching stages 58 and 59. The start of the switching process of the first switching stage 58 following the pulse source 35 is defined by the instants at which the field synchronizing pulses 18 of a video signal to be recorded appear, i.e. by their leading edges. The duration of the switching process of the switching stage 58 substantially correspond to the time interval $\tau_1$ between the instant at which a field synchronizing pulse 18, i.e. its leading edge, appears and the instant at which the erase head 6 or 7 of the rotary head system 1, whichever first scans the further track 28, reaches the further track 28. The beginning of the switching process of the second switching stage 59, which is controlled by the first switching stage 58, is determined by the trailing edge of the output signal 60 of the first switching stage 58. The switching time of the second stage 59 substantially corresponds to the time interval $\tau_2$, required by the erase head for scanning the further track 28 to be crossed.

When the switches 50, 53 and 54 are set to the position corresponding to the "recording" mode, the switch 31 is closed so that in this mode a previously recorded video signal is automatically trackwise erased prior to a new recording. For this purpose the erase signal from the erase oscillator 29 is fed to the erase heads 6, 7 of the rotary head system 1 via the gate circuit 32, which is conducting in the rest condition, and the switch 31. In order to prevent the field synchronizing pulses recorded in the further track 28 from being also erased by this erasing process, the transmission path 30 for the erase signal is interrupted by the gate circuit 32, while an erase head 6, 7 scans the track 28. For this the field synchronizing pulses 18, which are available at the output 19 of the separator stage 20 and which are derived from the video signal to be recorded present at the signal input 21 of the apparatus, are fed to the first switching stage 58 which feeds the control signal 60, which has a duration corresponding to the said time interval $\tau_1$, to the second switching stage 59. The trailing edge of the control signal 60 now starts the second switching stage 59, after which the switching signal 46, which as a duration corresponding to the said time interval $\tau_2$, appears at the output 39 of the switching device 36 which also constitutes the output of the second switching stage 59. The switching signal 46 blocks the gate circuit 32 via the control input 40, thus interrupting the transmission path 30 from the erase oscillator 29 to the erase heads 6, 7. After the time interval $\tau_2$ has elapsed the switching signal 46 is discontinued and the gate circuit 32 becomes conducting again, so that the trackwise erasing process proceeds. This allows a trackwise erasure, the erasing process being interrupted while the erase heads of the rotary head system scan the further track on the record carrier.

In the recording and/or playback apparatus of FIG. 3 an existing stage which carries field synchronizing pulses, viz. the separator stage 20, is directly employed as a pulse source. This step obviates the need for a separate pulse source, which for example in FIG. 1 comprises a magneto-motoric or a photo-electric pulse generator, which obviously leads to a simpler and cheaper design. This step furthermore yields the additional advantage that tolerance errors caused by magneto-motoric or photoelectric pulse generators are eliminated, thus also increasing the accuracy, When the switching device for controlling the gate circuit employs two separate switching stages, this moreover yields the advantage that the switching time of each switching stage can be selected or adjusted independently of the switching time of the other switching stage. As a result, the interruption of the track-wise erasing process can simply be adapted to the width and the arrangement of the further track. Furthermore, it enables the duration of the interruption of the erasure process to be adapted to the required degree of certainty that a signal recorded in the further track should not be erased.

It is obvious that a series of modifications to the embodiments described hereinbefore can be realized within the scope of the invention, specifically with respect to the circuit design of the pulse source, of the switching device and of the gate circuit.

What is claimed is:

1. A recording and/or playback apparatus for video signals of the type wherein a rotary head system transversely scans the entire width of a record carrier in a plurality of parallel tracks, the rotary head system comprising a recording head and/or playback head and an erase head for transversely erasing a recorded video signal, the improvement wherein the apparatus further comprises an additional stationary recording and/or playback head longitudinally scanning the record carrier along an additional track that crosses the path of the transversely recorded tracks, means for phase locking field synchronization pulses of said video signal to the angular position of said rotary head, said erase head being angularly displaced with respect to said recording head whereby the erase head initiates the scan of a first track on said carrier a predetermined first delay time after the recording head initiates the scan of a further track, terminal means for receiving timing pulses synchronized with the angular position of said rotary head system, delay means connected to said terminal means for converting said timing pulses into a blanking pulse coincident with the scan of the erase head across said additional track, a source of erase signals, AND-gate means connecting said erase signal source to said erase head and connected to said delay means for conducting said erase signals to said erase head in the absence of said blanking pulse and for blocking said erase signals to said erase head in response to the presence of said blanking pulse.

2. An apparatus as claimed in claim 1, wherein the delay means comprises two series-connected switching stages, the first switching stage connected to the terminal means responsive to the pulse from the pulse source for providing a primary output pulse delayed by a first delay period equal to the time between the instant that a pulse from the pulse source appears and the instant at which the erase head reaches the additional track to be crossed, the second switching stage which is connected to said first switching stage responsive to the primary output pulse for providing said blanking pulse with a pulse width which substantially corresponds to a time interval, required by the erase head for scanning the further track to be crossed, and the transmission path to the erase head being interrupted by the gate circuit during the operation of the second switching stage.

3. An apparatus as claimed in claim 1, wherein the field synchronizing pulses of said video signal are directly connected to said terminal means.

* * * * *